United States Patent [19]

Lindros, Jr.

[11] Patent Number: 5,044,111

[45] Date of Patent: * Sep. 3, 1991

[54] ANIMAL TRAP

[76] Inventor: Chester A. Lindros, Jr., 335 Woodruff Ave., Avenel, N.J. 07001

[*] Notice: The portion of the term of this patent subsequent to Aug. 21, 2007 has been disclaimed.

[21] Appl. No.: 568,019

[22] Filed: Aug. 16, 1990

Related U.S. Application Data

[63] Continuation-in-part of Ser. No. 519,427, May 4, 1990, Pat. No. 5,005,313, which is a continuation-in-part of Ser. No. 359,639, May 30, 1989, Pat. No. 4,949,499.

[51] Int. Cl.[5] ............................................. A01M 23/02
[52] U.S. Cl. ............................................. 43/61; 43/67
[58] Field of Search ................................ 43/61, 62, 67

[56] References Cited

U.S. PATENT DOCUMENTS

| 1,262,946 | 4/1918 | Harriman | 43/62 |
| 4,231,180 | 11/1980 | Bare | 43/61 |
| 4,291,486 | 9/1981 | Lindley | 43/62 |
| 4,557,066 | 12/1985 | Godwin, Jr. | 43/60 |
| 4,769,942 | 9/1988 | Copenhaver, Sr. | 43/61 |
| 4,949,499 | 8/1990 | Lindros, Jr. | 43/61 |

Primary Examiner—Kurt Rowan
Assistant Examiner—Rex E. Pelto
Attorney, Agent, or Firm—Ezra Sutton

[57] ABSTRACT

An animal trap having two housings slideable relative to each other to trap an animal therein. Removal of the bait by the animal causes the inner housing to slide into the outer housing and seal the trap with the animal therein.

6 Claims, 2 Drawing Sheets

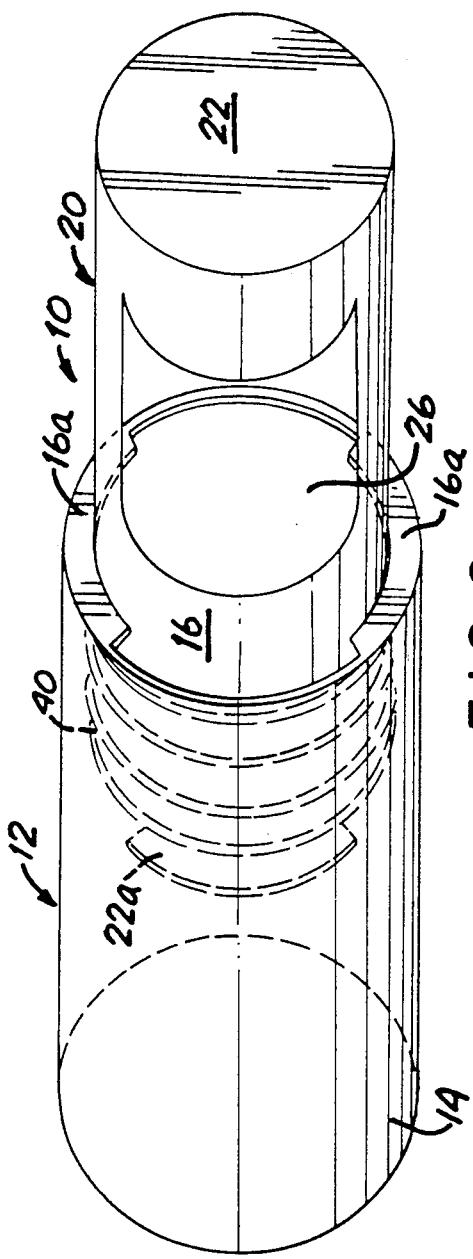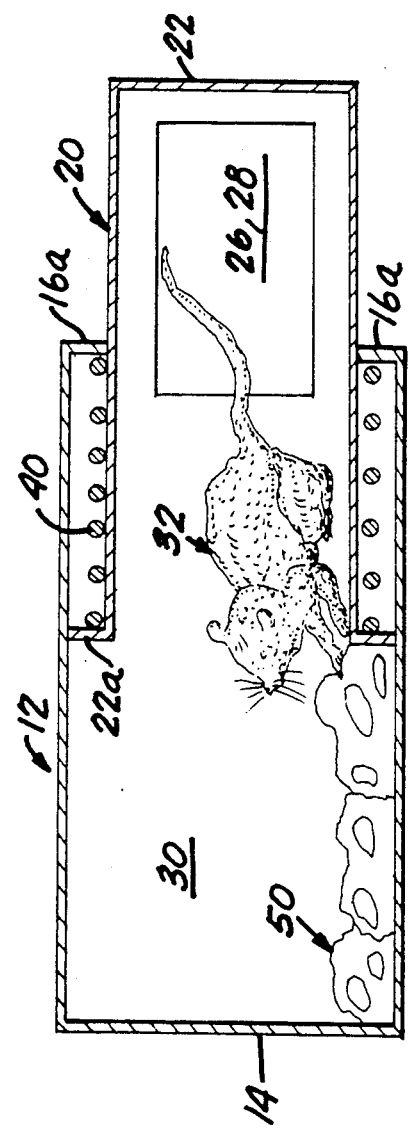

ANIMAL TRAP

This application is a continuation in part of application Ser. No. 07/519,427, filed May 4, 1990, now U.S. Pat. No. 5,005,313, which is a continuation in part of application Ser. No. 07/359,639, filed May 30, 1989, now U.S. Pat. No. 4,949,499.

FIELD OF THE INVENTION

The present invention relates generally to animal traps and more particularly to such traps being inexpensive and simple to manufacture and use.

BACKGROUND OF THE INVENTION

Many animal traps have been developed in the past for trapping and disposing of mice, rats, and the like. For example, U.S. Pat. No. 3,591,972 discloses a device which is expensive and complex. In addition, most such traps do not have the attributes of being simple to use and manufacture, inexpensive, and easy to clean.

Accordingly, it is an object of the present invention to provide an improved animal trap which is simple to use, easy to manufacture, inexpensive, and easy to clean, and generally overcomes the drawbacks of prior art devices.

SUMMARY OF THE INVENTION

In accordance with the present invention, there is provided an animal trap having an outer housing, an inner housing mounted within and movable relative to the outer housing to define a trapping area, at least one trap opening in the inner housing for an animal to enter the trapping area, a resilient spring device for moving the inner housing into the outer housing to close off the trap opening to trap an animal in the trapping area, and bait for holding the trap opening in an open position, so that when an animal in the trapping area eats the bait, the inner housing is moved into the outer housing to close off the trap opening to trap the animal in the trapping area.

In the preferred embodiment, the inner and outer housings are cylindrical in shape and are formed of plastic material, but they can also be formed of mesh material, depending on what type of animal is being trapped.

BRIEF DESCRIPTION OF THE DRAWINGS

Further objects, features, and advantages of the present invention will become apparent upon consideration of the detailed description of the presently-preferred embodiment, when taken in conjunction with the accompanying drawings wherein:

FIG. 2 is an elevational view with the inner housing moved partially into the outer housing; and FIG. 3 shows in cross section the bait holding the inner housing in a position to maintain the trap opening in its open position, and just prior to an animal eating the bait.

DETAILED DESCRIPTION OF PREFERRED EMBODIMENT

Figure 1:
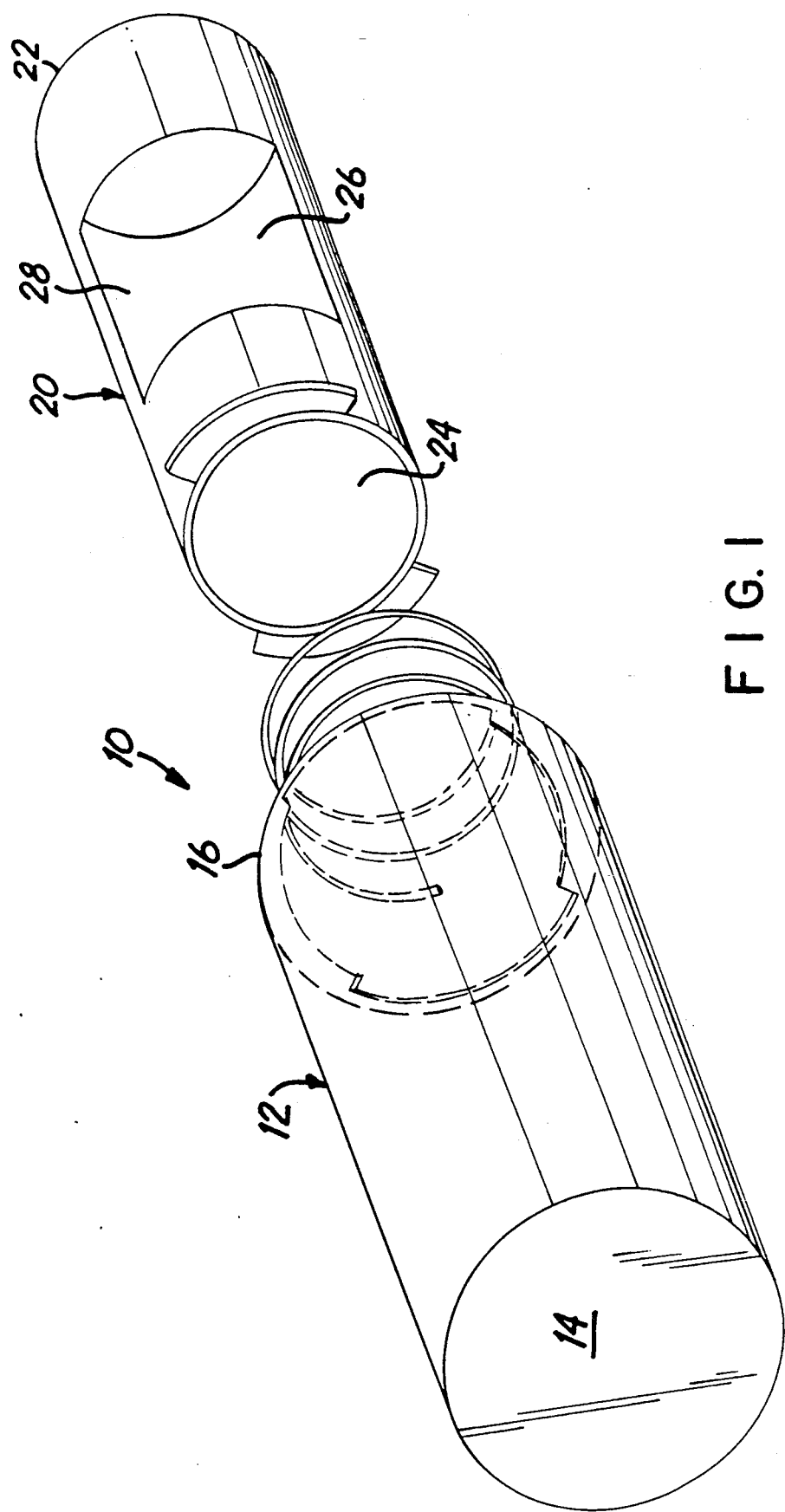
FIG. 1 is a perspective view of the inner and outer housings separated from each other and with the inner housing ready to slide into the outer housing.

In FIG. 1 there is shown the animal trap 10 which includes an outer housing 12 having a closed end 14 and an open end 16, with the housing having a generally-cylindrical configuration.

In addition, animal trap 10 includes an inner housing 20 having a closed end 22 and an open end 24. The inner housing 20 includes a trap opening 26 on one side of the housing and a similar opening 28 on the opposite side of the housing.

The inner housing is positioned and sized to be mounted within and slideable relative to the outer housing 20 to define a trapping area 30, as shown in FIG. 3, within the inner and outer housings 12, 20.

A resilient spring device 40 is provided for moving the inner housing 20 into the outer housing 12 to close off the trap openings 26 and 28, to thereby trap an animal in the trapping area 30.

The resilient spring device 40 can be made of any suitable material, and in the preferred embodiment herein, it is an expandable coil spring 40 which applies pressure to push the inner housing 20 into the outer housing 12 against the bait 50. More particularly, coil spring 40 is compressed by pulling housing 22 outwardly, and the bait 50 is placed between end wall 14 and the partial circular wall 22a of housing 20 to keep the spring 40 compressed. In setting the animal trap 10, the bait 50 is set between housings 12 and 20 to hold the inner housing 20 in an open position, so that trap openings 26 and 28 are opened and uncovered by the outer housing 12. In this manner, an animal can enter through the trap openings 26 and 28 and enter into the trapping area 30 and be led to the bait 50, which is holding the trap openings 26 and 28 in their open positions.

In this manner, when an animal in the trapping area 30 eats the bait 50, it no longer operates to hold the inner housing 20 in its open position As a result, coil spring 40 can expand and move the inner housing 20 into the outer housing 12 to close off the trap openings 26, 28 and thereby trap animal 32 in the trapping area 30, as shown most clearly in FIG. 3. As will be noted, coil spring 40 is held between circular wall sections 16a and 22a to define a spring housing.

It should be understood that in accordance with the present invention, the inner and outer housings may be formed of any other suitable shape in addition to cylindrical, and materials, such as mesh, may also be used. Further, any other resilient device equivalent to coil spring 40 may be employed.

In accordance with the present invention, there has been provided a new and advantageous animal trap which is simple to use, easy to manufacture, and easy to clean. Once an animal is caught in the trapping area 30, it can safely be carried therein to a disposal location where inner housing 20 is slid outwardly from outer housing 12, so that the animal can be dropped out of openings 26 or 28 and disposed of in a suitable manner. Alternatively, the entire trap 10 may be disposed of with the trapped animal contained therein.

A latitude of modification, change, and substitution is intended in the foregoing disclosure, and in some instances, some features of the invention will be employed without a corresponding use of other features. Accordingly, it is appropriate that the appended claims be construed broadly and in a manner consistent with the spirit and scope of the invention herein.

What is claimed is:

1. An animal trap, comprising:
   a) an outer housing having a closed end and an open end;

b) an inner housing having a closed end and an open end mounted within and movable relative to said outer housing to define a trapping area within said inner and outer housings;

c) at least one trap opening in said inner housing for an animal to enter said trapping area;

d) expandable spring means for moving said inner housing into said outer housing to close off said trap opening to trap an animal in said trapping area; and e) bait means for holding said trap opening in an open position so that when an animal in said trapping area eats said bait means, said expandable spring means moves said inner housing into said outer housing to close off said trap opening to trap an animal in said trapping area.

2. An animal trap in accordance with claim 1, wherein said inner and outer housings are cylindrical in shape and formed of plastic material.

3. An animal trap in accordance with claim 1, wherein said inner housing includes two trap openings.

4. An animal trap in accordance with claim 1, wherein said expandable spring means includes a coil spring, and said inner and outer housings define a chamber therebetween for receiving said coil spring.

5. An animal trap in accordance with claim 4, wherein one end of said chamber is formed by a wall section extending outwardly from said inner housing, and the other end of said chamber is formed by a wall section extending inwardly from said outer housing.

6. An animal trap in accordance with claim 1, wherein said inner housing includes a wall section for engaging said bait means.

* * * * *